(12) United States Patent
Ochiai et al.

(10) Patent No.: US 10,243,760 B2
(45) Date of Patent: Mar. 26, 2019

(54) COMMUNICATION DEVICE, COMMUNICATION METHOD, AND COMMUNICATION SYSTEM

(71) Applicants: TOYOTA JIDOSHA KABUSHIKI KAISHA, Toyota-shi, Aichi-ken (JP); SUMITOMO WIRING SYSTEMS, LTD., Yokkaichi-shi, Mie-ken (JP)

(72) Inventors: Yuta Ochiai, Anjo (JP); Hiroya Ando, Toyota (JP); Mitsutoshi Kato, Nagoya (JP); Naoto Kobayashi, Yokkaichi (JP)

(73) Assignees: TOYOTA JIDOSHA KABUSHIKI KAISHA, Toyota-shi (JP); SUMITOMO WIRING SYSTEMS, LTD., Yokkaichi-shi (JP)

( * ) Notice: Subject to any disclaimer, the term of this patent is extended or adjusted under 35 U.S.C. 154(b) by 154 days.

(21) Appl. No.: 15/124,214

(22) PCT Filed: Feb. 27, 2015

(86) PCT No.: PCT/JP2015/055868
§ 371 (c)(1),
(2) Date: Sep. 7, 2016

(87) PCT Pub. No.: WO2015/137164
PCT Pub. Date: Sep. 17, 2015

(65) Prior Publication Data
US 2017/0026198 A1 Jan. 26, 2017

(30) Foreign Application Priority Data
Mar. 10, 2014 (JP) .................................. 2014-046290

(51) Int. Cl.
*H04L 12/12* (2006.01)
*H04L 12/40* (2006.01)
(Continued)

(52) U.S. Cl.
CPC ....... *H04L 12/6418* (2013.01); *H04B 1/3822* (2013.01); *H04L 12/12* (2013.01);
(Continued)

(58) Field of Classification Search
CPC ....... H04L 1/08; H04L 1/1607; H04L 12/407; H04L 12/417; H04L 1/0061;
(Continued)

(56) References Cited

U.S. PATENT DOCUMENTS

2002/0012325 A1* 1/2002 Kikkawa ............. H04L 41/0677
370/311
2008/0262708 A1* 10/2008 Yamaguchi ........... F02D 41/266
701/112

(Continued)

FOREIGN PATENT DOCUMENTS

| EP | 2079190 A1 | 7/2009 |
|----|------------|--------|
| JP | 2001-339412 A | 12/2001 |
| JP | 2012-039446 A | 2/2012 |

*Primary Examiner* — Marsha D Banks Harold
*Assistant Examiner* — Dharmesh J Patel
(74) *Attorney, Agent, or Firm* — Hunton Andrews Kurth LLP (57) ABSTRACT

A communication device performs information communication through a communication line based on communication data specified by a CAN protocol. A communication necessity determination unit determines whether or not the information communication through the communication line is necessary based on external information obtained from an external device. When the information communication is necessary and a communication error is detected, a communication control unit stops the information communication during a fixed period and restarts the information communication after the fixed period elapses. When the information communication is unnecessary, the communication control
(Continued)

unit stops transmitting communication data until a predetermined transmission restarting condition is satisfied.

11 Claims, 5 Drawing Sheets

(51) Int. Cl.
    *H04L 12/64*     (2006.01)
    *H04B 1/3822*     (2015.01)

(52) U.S. Cl.
    CPC ............... *H04L 12/40039* (2013.01); *H04L 2012/40215* (2013.01); *H04L 2012/40273* (2013.01); *Y02D 50/40* (2018.01)

(58) Field of Classification Search
    CPC .......... H04L 1/1867; H04L 2001/0094; H04L 41/0833; H04L 12/12; H04L 12/40039; H04L 2012/40215; Y02D 50/30; Y02D 50/40
    See application file for complete search history.

(56) References Cited

U.S. PATENT DOCUMENTS

2012/0051241 A1     3/2012     Mori et al.
2013/0139018 A1     5/2013     Takada et al.

* cited by examiner

| Key Position | IG OFF | IG ON |
|---|---|---|
| GW | Valid | Active |
| Air Conditioner ECU | Valid | Valid |
| Audio ECU | Valid | Valid |
| Door ECU | Valid | Active |
| Seat ECU | Valid | Active |
| Charge Control ECU | Valid | Active |
| HVECU | Invalid | Active |
| Engine ECU | Invalid | Active |

Fig.6

| Operation Condition | Air Conditioner ON/OFF | Audio ON/OFF | Door Open/Close | Seat Movement |
|---|---|---|---|---|
| GW | ○ | × | × | × |
| Air Conditioner ECU | ○ | × | × | × |
| Audio ECU | × | ○ | × | × |
| Door ECU | × | × | ○ | × |
| Seat ECU | × | × | × | ○ |
| Charge Control ECU | ○ | × | × | × |
| HVECU | × | × | × | × |
| Engine ECU | × | × | × | × |

COMMUNICATION DEVICE, COMMUNICATION METHOD, AND COMMUNICATION SYSTEM

CROSS-REFERENCE TO RELATED APPLICATIONS

This is a national phase application based on the PCT International Patent Application No. PCT/JP2015/055868 filed Feb. 27, 2015, claiming priority to Japanese Patent Application No. 2014-046290 filed Mar. 10, 2014, the entire contents of both of which are incorporated herein by reference.

TECHNICAL FIELD

The present invention relates to a communication device connected to a network in a vehicle or the like, a communication method used by the communication device, and a communication system including the communication device.

BACKGROUND ART

As known in the art, electronic control units (ECUs) that are installed in a vehicle are often network-connected to configure a vehicle network system that allows the ECUs to transfer information with one another. Controller Area Network (CAN) is a communication system that configures such a vehicle network system.

CAN is provided with a function for detecting communication errors. More specifically, in CAN, an ECU that transmits data on the CAN bus monitors signals on the CAN bus when transmitting data and compares the monitored signals with signals based on the transmitted data. When the compared signals are in correspondence with each other, the ECU determines that communication has been correctly performed. When the compared signals are not in correspondence with each other, the ECU determines that a communication error has occurred.

In accordance with the CAN specification, normal communication is performed when the count number of communication errors cumulated by the ECU that transmits data is less than 256, and communication of the ECU is stopped when the count number reaches 256. When communication of the ECU is stopped in this manner, communication is restarted when the communication error count is reset. Patent document 1 describes one example of a technique for automatically resetting the communication error count to restart communication.

Patent document 1 describes a communication recovery determination method that clears the communication error count number after CAN communication is stopped and performs communication (transmission) only once after a predetermined time (e.g., 100 ms) elapses. In the process that performs communication (transmission) only once after the predetermined time elapses, when a communication error is detected, a process for performing communication (transmission) only once after a predetermined time elapses is repeated. When a communication error is not detected, normal communication is restarted.

Patent Document 1: Japanese Laid-Open Patent Publication No. 2001-339412

SUMMARY OF THE INVENTION

The technique described in patent document 1 restarts communication once the CAN bus is normalized even when a temporary anomaly occurs in the CAN bus. An increase in vehicles using batteries as power sources has resulted in reduced power consumption of communication systems. Thus, for example, ECUs may be configured to be activated only when required in accordance with the vehicle condition. However, the activation of only the required ECUs may lead to a communication error. In this case, the communication error would be continuous since it is not a temporary anomaly. Thus, even when the recovery determination process described above is performed, the ECUs will consume unnecessary power.

Accordingly, it is an object of the present invention to provide a communication device that reduces power for communication that is based on the CAN protocol, a communication method used for the communication device, and a communication system including the communication system.

The means for solving the problem and the effects will now be described.

One aspect is a communication device. The communication device is connected to an external device to obtain external information from the external device and is connected to a communication line to perform information communication through the communication line based on communication data specified by a CAN protocol. The communication device includes a communication necessity determination unit that determines whether or not the information communication through the communication line is necessary based on the external information obtained from the external device. The communication device further includes a communication control unit stops the information communication during a fixed period, under the condition that the determination by the communication necessity determination unit of whether or not the information communication is necessary is "affirmative" and that a communication error has been detected, and restarts the information communication after the fixed period elapses. The communication control unit stops transmitting communication data, under the condition that the determination by the communication necessity determination unit of whether or not the information communication is necessary is "negative", until a predetermined transmission restarting condition is satisfied.

A further aspect is a communication method for use with a communication device. The communication device is connected to an external device to obtain external information from the external device and is connected to a communication line to perform information communication through the communication line based on communication data specified by a CAN protocol. The communication method includes a communication necessity determination step of determining whether or not the information communication through the communication line is necessary based on the external information obtained from the external device. The communication method further includes a communication control step of stopping the information communication during a fixed period, under the condition that the determination of whether or not the information communication is necessary is "affirmative" and that a communication error has been detected, restarting the information communication after the fixed period elapses, and stopping transmission of communication data, under the condition that the determination of whether or not the information communication is necessary is "negative", until a predetermined transmission restarting condition is satisfied.

Another aspect is a communication system. The communication system includes a plurality of communication devices. Each of the communication devices is connected to an external device to obtain external information from the external device and is connected to a communication line to perform information communication through the communication line based on communication data specified by a CAN protocol. Each of the communication devices is the above-described communication device.

Such a configuration or method stops information communication during a fixed period, under the condition that the information communication is necessary and that a communication error has been detected, and restarts the information communication after the fixed period elapses, that is, performs recovery determination to restart communication at a suitable time. Under the condition that the information communication is not necessary, there is no need for the recovery determination. Thus, the transmission of communication data is stopped until a predetermined transmission restarting condition is satisfied. As a result, during communication based on the CAN protocol, unnecessary communication is restricted. This reduces unnecessary power consumption by the communication device.

In a preferred configuration, the communication control unit continues to receive communication data when the determination by the communication necessity determination unit of whether or not the information communication is necessary is "negative", and the transmission restarting condition includes the communication control unit receiving the communication data through the communication line.

In such a configuration, even when the determination by the communication necessity determination unit is "negative", when a change in the vehicle condition or the like causes the communication data to flow through the communication line, the transmission restarting condition is satisfied in response to the communication control unit receiving the communication data. In other words, when determined that information communication is unnecessary, the communication device is shifted to a reception wait state, which reduces power consumption, but can recover communication from the reception wait state.

In a preferred configuration, the transmission restarting condition includes the communication necessity determination unit determining that the information communication through the communication line is necessary.

In such a configuration, even when the determination by the communication necessity determination unit of whether or not the information communication is necessary is "negative", when a change in the vehicle condition or the like causes the communication necessity determination unit to determine that information communication is necessary, the transmission restarting condition is satisfied based on the determination. That is, when determined that information communication is unnecessary, communication can be recovered while reducing the power used for communication.

In a preferred configuration, the communication device is installed in a vehicle that uses a battery as a power source.

In such a configuration, the consumption of the battery can be reduced. That battery is installed in a vehicle that uses the battery as a power source, for example, a plugin hybrid vehicle or an electric vehicle. This maintains the state of charge of the battery.

In a preferred configuration, the communication necessity determination unit determines that the information communication through the communication line is unnecessary when detecting from the external information that the battery of the vehicle is being charged.

Such a configuration, in particular, reduces power consumption during the charging of the battery. This shortens the charging time.

In a preferred configuration, the communication necessity determination unit determines that the information communication through the communication line is unnecessary when detecting from the external information that only a device that does not require the information communication through the communication line has been operated.

In such a configuration, the information communication is restricted when the device that is operated does not require the information communication. This reduces power consumption.

In the preferred configuration, the operation of only a device that does not require the information communication through the communication line includes at least one of a door open/close operation and a seat position operation.

A door open/close operation and a seat position operation are performed when the vehicle is parked. When the vehicle is parked in such a manner, only communication devices required for such operations need to be activated. Such operations usually do not need the information communication to be performed through the communication line. Thus, in such a configuration, the information communication is not performed when only a door open/close operation or a seat position operation is performed. This reduces power consumption of the communication device.

In the preferred configuration, the communication device has setting information associated with the external information and indicating whether or not a communication peer that performs the information communication through the communication line exists, and the communication necessity determination unit determines whether or not the information communication through the communication line is necessary based on the setting information and the obtained external information.

In such a configuration, the setting information indicating whether or not the information communication through the communication line is necessary is used for determinations based on the type of the external information. This improves the determination accuracy.

In the preferred configuration, the communication necessity determination unit stores a history of the information communication performed through the communication line in association with the external information obtained at that time and determines whether or not a communication peer associated with the external information exists by referring to the stored history.

In such a configuration, the history of the information communication performed through the communication line is stored in association with the external information. Further, it is determined whether or not a communication peer associated with the external information exists by referring to the stored history. For example, after the vehicle is shipped from the manufacturing plant, when there is a change in the type or number of ECUs or the like connected to the communication line or when the functions are changed and the communication peer is thus changed, the use of the history allows such changes to be coped with. This enables the existence of a communication peer corresponding to the obtained external information to be determined in a suitable manner.

DESCRIPTION OF THE EMBODIMENTS

First Embodiment

A first embodiment of a communication system that includes a communication device will now be described with reference to FIGS. 1 to 3.

Figure 1:
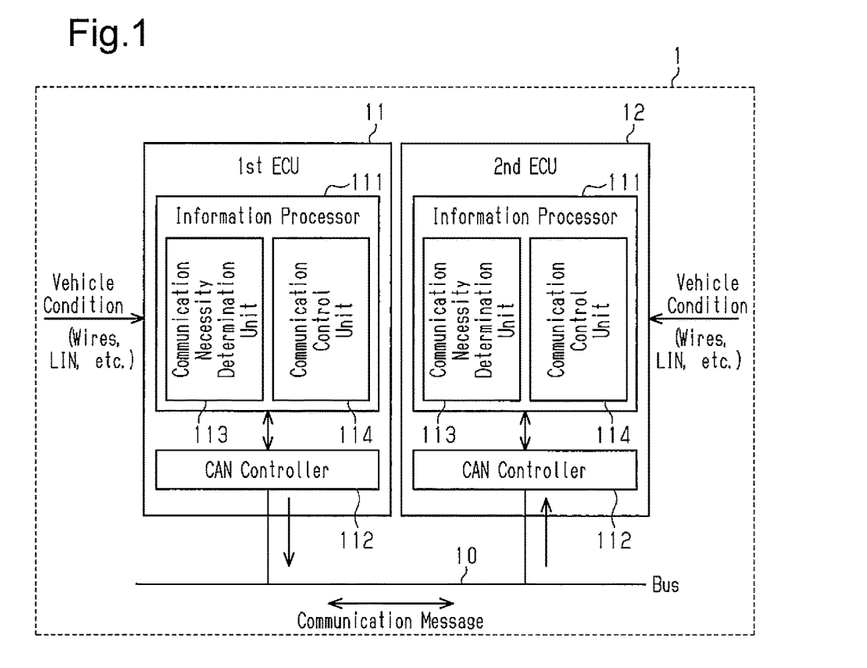
FIG. 1 is a schematic block diagram illustrating a first embodiment of a communication system including a communication device.

As illustrated in FIG. 1, the vehicle 1 includes a vehicle network system that serves as a vehicle network system. The vehicle 1 is a plugin hybrid vehicle or electric vehicle that uses a battery, which is chargeable by an external power supply, as a power source.

The communication system includes a first electronic control unit (ECU) 11, a second ECU 12, and a communication bus 10 that serves as a communication line connecting the first and second ECUs 11 and 12 to each other. Thus, the first and second ECUs 11 and 12 are capable of transferring (transmitting and receiving) various types of control information and the like to each other. The communication system is configured as a Controller Area Network (CAN). Hence, the CAN protocol is used as the communication protocol.

The communication bus 10, which is configured by a communication wire such as a twisted cable, uses the communication wire to transmit a communication message as communication data that is in units complying with the CAN protocol communication. In addition to the communication bus 10, a wireless communication may be used in part of a communication line. Further, another network that is connected to the communication bus 10 by a gateway may be used in part of the communication line.

The CAN protocol specifies four types of frames as frames that form the structure of a communication message. One of the frames is a data frame Fd that can store data designated by the user. The structure of a communication message serving as communication data of the CAN protocol will now be described using a data frame Fd as an example.

Figure 2:
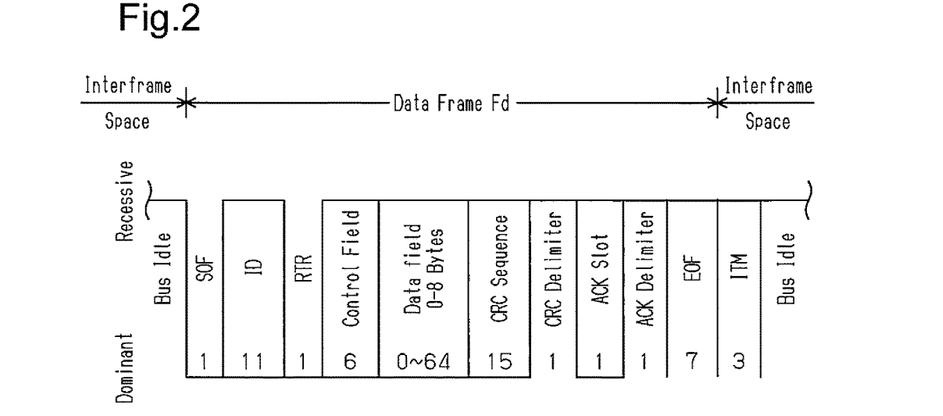
FIG. 2 is a diagram illustrating the configuration of a communication message based on the CAN protocol.

As illustrated in FIG. 2, the data frame Fd includes a region storing a "message ID" that mainly indicates the content of the communication message ("ID" in FIG. 2) and a region of "data field" that stores data designated by the user. The "data field" is set to have a length of any one of 0 to 64 bits (8 bits×0 to 8 bytes). Further, the data frame Fd includes a start of frame (SOF) region, a remote transmission request (RTR) region, a control field region, a CRC region, an acknowledge (ACK) region, and an EOF region that are specified by the CAN protocol.

The ACK region is a region used to check that the frame has been normally received. The ACK region is configured by a single-bit ACK slot, in which a response confirmation is transmitted from the receiving side, and a single-bit ACK delimiter, which delimits the ACK slot. The ACK delimiter is always "1" (recessive). Communication protocols include a protocol that provides an acknowledge frame separately from the data frame. However, in the CAN protocol, the receiving side returns an acknowledgement as a response confirmation when the transmitting side is transmitting the ACK slot of the data frame Fd. More specifically, the transmitting side sets the ACK slot of the data frame Fd to "1". The receiving side checks the contents of the received data frame Fd with a check code stored in the CRC region. When the result of the check is normal, the receiving side sets the ACK slot to "0." When the result of the check is abnormal, the receiving side sets the ACK slot to "1" to return an acknowledgment. When the receiving side does not exist, the ACK slot remains set to "1," which is set by the transmitting side.

In the CAN protocol, as a signal on the communication bus 10, "0" (dominant) has a higher level of superiority than "1" (recessive). Thus, even when the transmitting side sets the ACK slot to "1," as long as the receiving side sets the ACK slot to "0," the ACK slot monitored by the transmitting side becomes "0." As a result, when the ACK slot monitored by the transmitting side is the transmitting side can confirm that the transmitted data frame Fd was normally received by the receiving side. When the ACK slot monitored by the transmitting side is "1," the transmitting side can confirm that the transmitted data frame Fd was not normally received by the receiving side. In this manner, when the ACK slot monitored by the transmitting side is "1," the transmitting side determines that an ACK error, which is a communication error, has occurred. When there is no response from the receiving side (other ECU), the transmitting side determines that an ACK error has occurred since there is no response. Factors that result in no response from other ECUs include a case in which the vehicle condition is such that only one ECU is activated on the communication bus and a case in which the communication bus 10 is free from option ECUs (optionless) that need not be connected to the communication bus 10.

A remote frame, which is one of the frames in a communication message of the CAN protocol, also includes the ACK region and thus can be used to determine whether or not an ACK error has occurred.

Accordingly, in CAN, when the transmitting side ECU transmits a data frame Fd when there are no receiving side ECUs that receive the data frame Fd, the transmitting ECU detects an ACK error. The detected communication error increases the error count. In CAN, a state in which the error count of communication errors is 127 or less refers to an "error active" state. A state in which the error count of communication errors exceeds 127 refers to an "error passive" state. A state in which the error count of communication errors reaches 256 refers to a "bus off" state. The "error active" state refers to a state in which normal signal transmission and reception can be performed. The "error passive" state refers to a state in which signal transmission and reception can be continued under a restriction-imposed situation. The "bus off" state is a state in which the ECU is disconnected from the network. In the "error passive" state, when a state of no errors continues, the counter value decreases and the ECU returns to the "error active" state. However, once the ECU enters a "bus off" state, it is difficult to recover from the "bus off" state since the ECU needs to be reset or reconfigured. Thus, in the first embodiment, as normal error processing, when a communication error is detected, the error is processed by clearing the error count of the communication error and performing communication (transmission) only once after a predetermined time (e.g., 100 ms) elapses to enable automatic recovery. The predetermined time is set in advance based on experience, experiments, and logic so as not to increase the communication load on the communication bus 10 keep the delay time for recovery is short.

Referring to FIG. 1, each of the first and second ECUs 11 and 12 is a control unit used for various controls of the vehicle 1 and is an ECU of which the control subject is, for example, a drive system, a traveling system, a body system, an information device system, or the like. Examples of ECUs of which the control subject is the drive system includes an engine ECU, a hybrid vehicle (HV) ECU, and a charge control ECU. Examples of ECUs of which the control subject is the traveling system include a steering ECU and a brake ECU. Further, examples of ECUs of which the control subject is the vehicle body include a door ECU, a seat ECU, a light ECU, a window ECU, and an air conditioner ECU. Examples of ECUs of which the control subject is the information device system include an audio ECU and a car navigation ECU.

The first and second ECUs 11 and 12 are each connected to an external device such as a device that is a monitoring subject or a device that is a control subject by a Local Interconnect Network (LIN) so that signals are receivable. The external device detects information or the like related to the vehicle condition with a sensor or the like and outputs the detected vehicle condition as external information. The first and second ECUs 11 and 12 each obtain the signals output from the external device as external information. Examples of external devices include a device that detects and controls the opening and closing of a door and a device that detects and controls the shape of a seat. Examples of the external information include open/close information and operation information of a door and shape information and operation information of a seat.

The first ECU 11 and the second ECU 12 each include an information processor 111, which executes processes required for various types of control and processes communication information, and a CAN controller 112, which transmits and receives communication messages that are in accordance with the CAN protocol. The information processor 111 and the CAN controller 112 are connected by an internal bus or the like so that various types of data can be transferred between the information processor 111 and the CAN controller 112. The first and second ECUs 11 and 12 perform error processing related with the CAN protocol described above through the processing performed by the information processor 111 and the CAN controller 112.

The CAN controller 112 transmits and receives communication messages to and from the communication bus 10. The CAN controller 112 receives communication messages that comply with the CAN protocol and transmits communication messages that comply with the CAN protocol. That is, the first and second ECUs 11 and 12 each transmit and receive communication messages to the communication bus 10 via the CAN controller 112. Thus, the first and second ECUs 11 and 12 are capable of transmitting and receiving communication messages to each other that have frame structures specified by the CAN protocol through the CAN controllers 112.

The CAN controller 112 provides the information processor 111 with data or the like that are included in a communication message. Further, the CAN controller 112 transmits a communication message based on the content of data or transmission instruction provided from the information processor 111.

Further, the CAN controller 112 monitors the communication message that is being transmitted to detect collision of the communication message undergoing transmission with another communication message and perform arbitration to prevent collision of the communication message and detection of the ACK response. Further, the CAN controller 112 provides the information processor 111 with a signal of the detected ACK region. Consequently, the information processor 111 detects whether or not there is an ACK error for the transmitted communication message based on whether the signal of the ACK slot is "1" or "0" during the transmission of the information message.

Each information processor 111 of the first and second ECUs 11 and 12 may include a computer (CPU) and a microcomputer having a memory. That is, the information processor 111 includes a computer that executes a computation process of a control program, a read only memory (ROM) that stores the control program and data, and a random access memory (RAM) that temporarily stores the computation result of the computer. The information processor 111 reads the control program held in the memory with the computer and executes the program to exhibit a predetermined function for the control subject and control the control subject.

The information processor 111 includes a communication necessity determination unit 113, which determines whether or not the transfer of a communication message through the communication bus is necessary, and a communication control unit 114, which controls the transmission and reception of a communication message. The information processor 111 reads and executes with the computer a program for determining the necessity to transfer a communication message held in the memory and a program for performing various types of processes to control the transmission and reception of a communication message. As a result, the information processor 111 functions as the communication necessity determination unit 113 and the communication control unit 114.

The communication necessity determination unit 113 uses the external information input to (obtained by) the ECUs 11 and 12 to determine whether or not there is a need for performing information communication such as the transmission of a communication message through the communication bus 10 (communication necessity determination step). Examples of such external information include an operation input and a response input from external devices connected to the ECUs 11 and 12. The external information may include information of the key position of the vehicle and information that charging is being performed. When determining from the external information that the ECU can solely process the control subject device (external device), the communication necessity determination unit 113 determines that information communication is not required, or "negative." Otherwise, for example, when determining from the external information that there is a need for the control subject device (external device) to cooperate with another device, the communication necessity determination unit 113 determines that information communication is required, or "affirmative." Examples of processes performed on the control subject device that are determined as not requiring information communication include a process for opening and closing the door when the vehicle is parked, a process for moving a seat when the vehicle is parked, and a process for activating the audio when the vehicle is parked. The parking of the vehicle may be determined when the key is located at the "IG OFF" position or when the vehicle 1 is being charged. Examples of processes performed on the control subject device that are determined as requiring information communication include a process for activating the air conditioner of the parked vehicle. The determination of the processes and the necessity of information communication may differ in accordance with the vehicle type or configurations.

The communication control unit 114 is able to obtain the determination result of whether or not information communication is necessary from the communication necessity determination unit 113. Further, the communication control unit 114 is able to obtain data of the ACK region detected by the CAN controller 112 to determine whether or not an ACK error exists. Further, based on the determination result of whether or not an ACK error exists and whether or not information communication is necessary, the communication control unit 114 controls information communication that is performed through the CAN controller 112 (communication control step).

In detail, when there is no ACK error, the communication control unit 114 does not restrict transmission of a communication message from the CAN controller 112 and performs normal CAN communication.

When there is an ACK error, the communication control unit 114 also refers to the determination result of whether or not information communication is necessary to control information communication. That is, when there is an ACK error and the determination result indicates that information communication is necessary, the communication control unit 114 maintains normal CAN communication and performs normal error processing without restricting transmission of a communication message from the CAN controller 112. In the first embodiment, normal error processing is, for example, under the condition that a communication error is detected, performing a process that stops the transmission and reception of a communication message during a fixed period (e.g., 100 ms) and restarting information communication after the fixed period elapses. Thus, the normal error processing is repeated whenever determined that there is an ACK error and information communication is necessary.

When determined that there is an ACK error and that information communication is not necessary, the transmission of a communication message from the CAN controller 112 is restricted, but the reception of a communication message by the CAN controller 112 is continued. When successively determined that there is an ACK error and that information communication is not necessary, the restriction on the transmission of the communication information and the reception of the communication information are continued. Since the CAN controller 112 receives communication messages, normal CAN communication is performed. Thus, even if the receiving side ECU is not activated when the transmitting side ECU is activated, when the receiving side ECU is activated by a subsequent change in the vehicle condition and thus it becomes necessary to perform information communication, such a change may be coped with. Examples of a communication message received by the CAN controller 112 include a communication message transmitted from another ECU that is activated as a receiving side.

Figure 3:
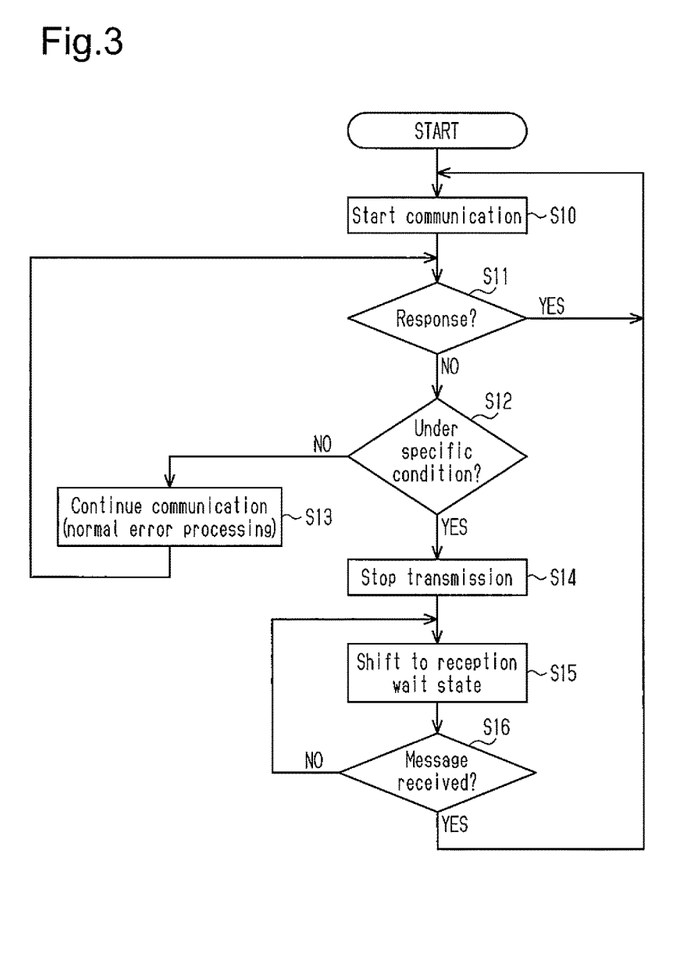
FIG. 3 is a flowchart illustrating the procedures of a process for stopping and restarting communication performed by a communication control unit of the communication system.

With reference to FIG. 3, the processing of a communication error in the first and second ECUs 11 and 12 will now be described. For the sake of brevity, the processing of a communication error by the first ECU 11 will be described, and the processing of a communication error by the second ECU 12 will not be described. In this case, the first ECU 11 will be described as the transmitting side, and the second ECU 12 will be described as the receiving side.

The first ECU 11 starts to function and start normal CAN communication when the power goes on or when activated from a sleep state (step S10). An ECU is in a sleep state when shifted to a power save mode to reduce power consumption under the condition that the ECU is supplied with power but does not have to be active. One example of a vehicle condition in which an ECU other than a charge control ECU is in a sleep state is when the battery is being charged. The ECU is activated from a sleep state under the condition that a device that is subject to control is operated during a power save mode. Examples of an operation for activating the ECU from a sleep state include the operation of an air conditioner, operation of the audio, opening and closing of a door, and changing of a seat position. Thus, the ECU is activated from a sleep state during charging of the vehicle when the user performs an operation to activate the air conditioner because it is hot, watch an on-board TV since there is nothing to do, open the door to enter the vehicle, or change the seat position.

When normal CAN communication starts in step S10, the first ECU 11 determines whether or not there is a response to the transmitted communication message (step S11). The determination of whether or not there is a response is based on whether or not there is an ACK error. There is a response when there is no ACK error, and there is no response when there is an ACK error. In the first embodiment, there is a response when the second ECU 12 is activated, and there is no response when the second ECU 12 is not activated. When determining that there is a response (YES in step S11), the first ECU 11 returns to step S10 and starts normal CAN communication with the next communication message, that is, the first ECU 11 continues normal CAN communication. When determining that there is no response (NO in step S11), the first ECU 11 determines whether the vehicle is under a specific condition (step S12). The specific condition of the vehicle is a condition that determines whether or not information communication is necessary. In detail, when determined that information communication is required ("affirmative"), it is determined that the vehicle is not under the specific condition. When determined that information communication is not required ("negative"), the vehicle is under a specific condition.

When determined that the vehicle is not under the specific condition (NO in step S12), the first ECU 11 continues communication that is in accordance with the normal communication error processing (step S13). In normal communication error processing, as a recovery determination, the transmission of a communication message is repeated in fixed intervals (e.g., 100 ms) to check whether or not there is an ACK error. When normal error processing is performed, the first ECU 11 consumes power whenever transmitting a communication message.

When determined that the vehicle is under the specific condition (YES in step S12), the first ECU 11 stops transmitting communication messages (step S14) and shifts to a reception wait state to continue the reception of a communication message (step S15). Under the specific condition, information communication is unnecessary and communication recovery is not performed. Thus, the recovery determination of step S13 is not performed. Consequently, since in the reception wait state a communication message is not transmitted, power consumption of the first ECU 11 is reduced. The amount of the power consumed over a long period to transmit communication messages in fixed intervals cannot be ignored even when the interval is long. Thus, when the battery of the vehicle 1 is being charged by an external power supply, such reduction in power consumption of the ECU or the like shortens the charging time and improves convenience for the user of the vehicle 1 provided with the battery.

Then, the first ECU 11 determines whether or not communication messages are received at a predetermined interval or timing in the reception wait state (step S16). More specifically, in the first embodiment, the transmission restarting condition is the reception of a communication message. When determining that a communication message has not been received (NO in step S16), the first ECU 11 returns to step S15 to be in the reception wait state again. When determining that a communication message has been received (YES in step S16), the first ECU 11 returns to step S10 and starts normal communication with the next communication message. Even when an ECU shifts to the reception wait state, the ECU is activated from the sleep state when an operation performed by the user or the like changes the vehicle condition. Thus, the reception wait state prepares the first ECU 11 to receive a signal from another ECU and respond in a suitable manner to the communication message from the other ECU.

The operations in the communication error processing are performed when the first ECU 11 is activated and ended when the first ECU 11 is deactivated or reset.

In the prior art, during manufacturing or maintenance, an external device can set transmission stopping conditions for an ECU in accordance with the vehicle specification or vehicle situation to stop transmissions. However, in the first embodiment, even when the ECU remains installed in a vehicle, the existence of an ECU that requires information communication and the activated state of other ECUs can be periodically determined to stop transmission from the ECU.

This provides a communication device, a communication method used for the communication device, and a communication system including the communication system that reduce power consumed for communication that is based on the CAN protocol.

The communication system in the first embodiment has the advantages described below.

(1) When information communication is necessary, under the condition that an ACK error is detected, information communication is stopped for a fixed period and then restarted after the fixed period elapses. That is, the recovery determination is performed to restart communication in a suitable manner. When information communication is not required, the information communication is not required from the first place and there is no need for the recovery determination. Thus, the transmission of the communication message is stopped until predetermined transmission restarting conditions are satisfied. This reduces unnecessary communication when CAN protocol communication is performed and thereby reduces the power consumed for communication by the communication device.

(2) Even when the information communication necessity determination made by the communication necessity determination unit 113 is "negative," as long as a change or the like in the condition of the vehicle 1 causes a communication message to flow through the communication bus 10, the transmission restarting conditions are satisfied when the flowing communication message is received. More specifically, when determined that information communication is not required, the ECU waits for signals while reducing power consumption and is able to recover communication from the reception wait state.

(3) The consumption amount of the battery, which is installed in a plugin hybrid vehicle or an electric vehicle and used as a power source, is reduced. This maintains the state of charge of the battery.

(4) In particular, power consumption is reduced when the battery is being charged. This shortens the charging time.

(5) The necessity of information communication through the communication bus 10 is determined in accordance with the type of the external information. This improves the accuracy of the determination.

Second Embodiment

A second embodiment of a communication system including a communication device will now be described with reference to FIGS. 4 to 7. The second embodiment differs from the first embodiment in that the communication system is configured by three communication buses that are connected by a gateway (GW) in a communicable manner. The three communication buses perform CAN protocol information communication in the same manner as the first embodiment. Thus, the CAN protocol information communication described in detail in the first embodiment will not be described below. The vehicle 2 is a plugin hybrid vehicle or an electric vehicle including a battery that is chargeable by an external power supply.

Figure 4:
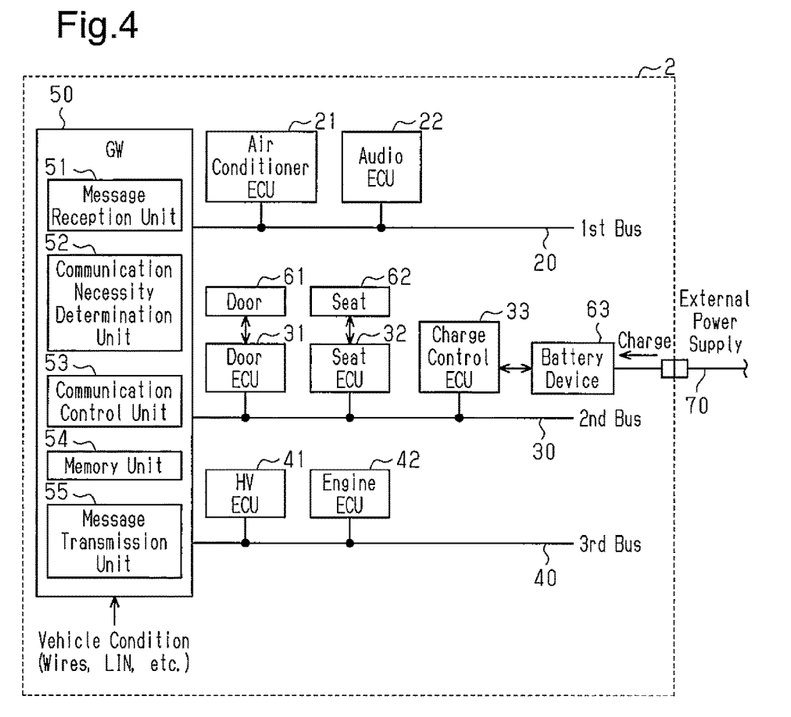
FIG. 4 is a schematic block diagram illustrating a second embodiment of a communication system including a communication device.

As illustrated in FIG. 4, a communication system of a vehicle 2 includes a gateway (GW) 50. The communication system also includes a first bus 20, a second bus 30, and a third bus 40, which serve as communication lines connected to the GW 50. The first to third buses 20, 30, and 40 are configured by, for example, twisted pair cables and each configured as a bus capable of transferring a CAN protocol communication message. The GW 50 can relay (transfer) CAN protocol communication messages input from the first to third buses 20, 30, and 40 to another connected bus. Thus, the communication system has a configuration in which the first to third buses 20, 30, and 40 are connected to one another by the GW 50. That is, the communication system has a star-type network configuration. Further, the communication system is configured as a system that relays (transfers) CAN protocol communication messages among the first to third buses 20, 30, and 40.

ECUs are connected to each of the first to third buses 20, 30, and 40 so that each ECU is able to communicate with the other ECUs through the corresponding bus. For example, an air conditioner ECU 21 and an audio ECU 22, which serve as communication devices, are connected to the first bus 20. A door ECU 31, a seat ECU 32, and a charge control ECU 33, which serve as communication devices, are connected to the second bus 30. An HV ECU 41 and an engine ECU 42, which serve as communication devices, are connected to the third bus 40. Although not illustrated in the drawings, the ECUs have the same configuration as the information processor 111 and the CAN controller 112 of the first embodiment.

The air conditioner ECU 21 is an ECU that controls a vehicle air conditioner serving as a control subject device (external device) and obtains external information from the connected vehicle air conditioner. The audio ECU 22 is an ECU that controls the vehicle audio serving as a control subject device (external device) and obtains external information from the connected vehicle audio.

The door ECU 31 is an ECU that controls each door device of a vehicle door 61 serving as a control subject device (external device) and obtains external information from the door devices connected by wires or the LIN. The seat ECU 32 is an ECU that controls each seat device of a vehicle seat 62 serving as a control subject device (external device) and obtains external information from the door devices connected by wires or the LIN. The charge control ECU 33 is an ECU that controls the output of power from a battery device 63 serving as a control subject device (external device) and the charging of the battery device 63 with power from an external power supply 70. The charge control ECU 33 is capable of charging and discharging the battery device 63 that is connected by a wire or the like. The charge control ECU 33 periodically transmits information indicating that charging is being performed to each part of the vehicle 2 when necessary through a suitable communication line.

The hybrid (HV) ECU 41 is an ECU that plans or adjusts the power distribution of battery driving and engine driving. The HV ECU 41 obtains various types of information through CAN communication to plan and adjust battery driving and engine driving based on the various type of information that is obtained. The engine ECU 42 is an ECU that controls the driving of the engine, which is an internal combustion engine. The engine ECU 42 controls the driving of the engine based on various types of information obtained from various engine-related devices and other types of devices serving as control subject devices connected by wires or the CAN.

The GW 50 is a device that relays communication messages received from a single bus to the other buses. That is, the GW is a device that relays communication messages among the buses. Thus, the buses 20 to 40 transfer messages with one another through the GW 50, which is connected to the buses 20 to 40. The GW 50 is an ECU and configured by a microcomputer including a computer and a memory unit. The GW 50 has the computer read and execute control programs and various parameters stored in a memory unit 54 to provide a predetermined function such as a communication message relay function. The GW 50 obtains the vehicle conditions from the external devices through wires or the LIN and receives CAN protocol communication messages as the vehicle condition from the external devices.

Figure 5:
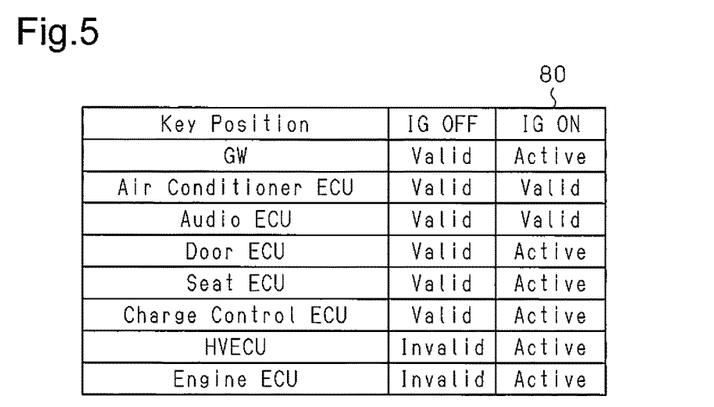
FIG. 5 is a list illustrating ECUs activated in correspondence with external information in the communication system.
Figure 6:
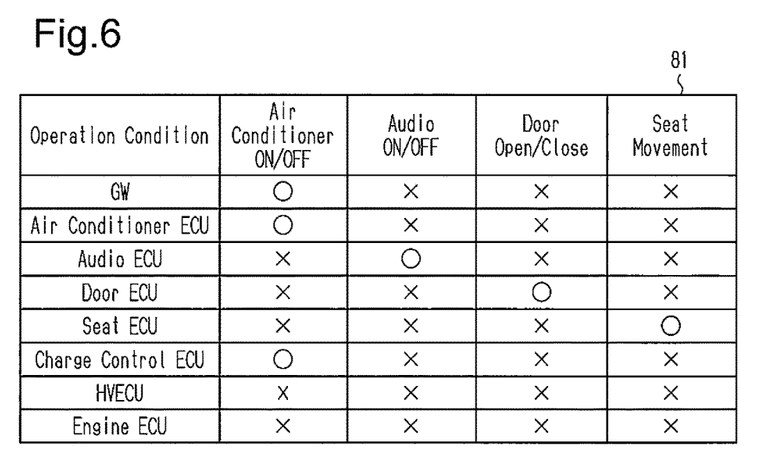
FIG. 6 is a list illustrating combination of ECUs that need to be activated in correspondence with external information in the communication system.

As illustrated in FIGS. 5 and 6, the ECUs 21 to 42 and the memory unit 54 of the GW 50 store setting information used to determine the necessity of communication.

FIG. 5 illustrates a list 80 indicating activation enablement (valid) and disablement (invalid), and activation, of the GW 50 and the ECUs 21 to 42 with respect to the key position. As indicated in list 80, the memory unit 54 or the like stores settings indicating that the key position of "IG OFF" enables the activation of the GW 50, the air conditioner ECU 21, the audio ECU 22, the door ECU 31, the seat ECU 32, and the charge control ECU 33 and disables the activation of the HV ECU 41 and the engine ECU 42. Here, the key position of "IG OFF" includes the key position of "OFF" and the key position of "ACC". The key position of "IG ON" supplies power and activates the GW 50, the door ECU 31, the seat ECU 32, the charge control ECU 33, the HV ECU 41, and the engine ECU 42. The key position of "IG ON" also enables activation of the air conditioner ECU 21 and the audio ECU 22. The setting information stored in each of the ECUs 21 to 42 may be only information related to the bus to which the ECU is connected.

FIG. 6 illustrates a list 81 indicating vehicle conditions recognized from external information and whether there is a need for activation in correspondence with the vehicle condition the GW 50 and the ECUs 21 to 42. As indicated in list 81, the memory unit 54 or the like stores settings indicating the necessity for the transfer of a communication message of the GW 50 and the necessity for the activation of the ECUs 21 to 42 with respect to the vehicle conditions of "air conditioner on/off," "audio on/off," "door open/close," and "seat movement." In FIG. 6, a circle indicates that transfer or activation is necessary, and a cross indicates that transfer or activation is unnecessary. In detail, the settings are such that when an "air conditioner on/off" operation is performed, the GW 50 needs to transfer a communication message. Further, the air conditioner ECU 21 and the charge control ECU 33 need to be activated but the other ECUs do not need to be activated. When an "audio on/off" operation is performed, the audio ECU 22 needs to be activated but the other ECUs do not need to be activated. Further, the GW 50 does not need to transfer a communication message. When a "door open/close" operation is performed, the door ECU 31 needs to be activated but the other ECUs do not need to be activated. Further, the GW 50 does not need to transfer a communication message. When, a "seat movement" operation is performed, the seat ECU 32 needs to be activated but the other ECUs do not need to be activated. Further, the GW 50 does not need to transfer a communication message. The setting information stored in each of the ECUs 21 to 42 may be only information related to the bus to which the ECU is connected.

The GW 50, which is connected to the first to third buses 20 to 40, includes a message reception unit 51, which receives communication messages from the buses 20 to 40, and a message transmission unit 55, which transmits communication messages to the buses 20 to 40. The GW 50 includes a communication necessity determination unit 52, which determines the necessity for relaying the received communication message, and a communication control unit 53, which controls the transmission of a communication message in accordance with the determination result of the communication necessity determination unit 52, and the memory unit 54, which stores setting information used when the communication necessity determination unit 52 makes determinations.

The message reception unit 51 receives CAN protocol communication messages and enables the communication necessity determination unit 52 of the GW 50 to use the data or the like included in the communication messages. The communication control unit 53 controls the transfer of communication messages from the message transmission unit 55 to the buses 20 to 40, which are the transmission subjects. Thus, for example, the GW 50 transfers a communication message received from the first bus 20 to the second and third buses 30 and 40, a communication message received from the second bus 30 to the first and third buses 20 and 40, and a communication received from the third bus 40 to the first and second buses 20 and 30. A bus that does not transfer a communication message may be included.

The communication necessity determination unit 52 has the same function as the communication necessity determination unit 113 of the first embodiment. The communication necessity determination unit 52 determines whether or not information communication that transfers a communication message is necessary based on external information, such as information received (obtained) from an external device and information of the communicating ECU, and the setting information used to determine the necessity of communication that is stored in the memory unit 54. When determining from the external information that the communicating ECU can solely perform a process on the control subject device, the communication necessity determination unit 52 determines that information communication is unnecessary. In other cases, for example, when determining that another device is needed to control the control subject device, the communication necessity determination unit 52 determines that information communication is necessary. Further, the communication necessity determination unit 52 obtains information of the key position of the vehicle 2 and determines whether or not information communication through the transfer of a communication message is necessary based on the key position information and the setting information used to determine the necessity of communication that is stored in the memory unit 54.

For example, when the vehicle is parked and the key position is "IG OFF" as indicated in list 80, the communication necessity determination unit 52 determines that information communication is unnecessary since each ECU can solely perform the processes indicated in list 81, namely, the process for activating the audio, the process for opening and closing the door 61, and the process for moving the seat 62. When, for example, the key position is "IG OFF," in the process for activating the air conditioner, the communication necessity determination unit 52 determines that information communication is necessary because a number of ECUs of different buses need to perform processing.

Further, for example, when the vehicle is stopped or travelling and correspond to the key position of "IG ON" as indicated in list 80, the communication necessity determination unit 52 determines that information communication is necessary since the GW 50 is supplied with power and activated as indicated in list 80 even though each ECU can solely perform the processes indicated in list 81, namely, the process for activating the audio, the process for opening and closing the door 61, and the process for moving the seat 62. Further, when the key position is "IG ON," the communication necessity determination unit 52 determines that in the process for activating the air conditioner, information communication is necessary because processing is necessary in a number of different ECUs of the connected buses.

The communication control unit 53 has the same function as the communication control unit 114 of the first embodiment. The communication control unit 53 is capable of obtaining the determination result of whether or not information communication is necessary from the communication necessity determination unit 52 and capable of determining whether or not an ACK error exists by obtaining data of the ACK region detected by the message reception unit 51. Based on whether or not an ACK error exists and the determination result of whether or not information communication is necessary, the communication control unit 53 controls information communication performed through the message transmission unit 55.

Figure 7:
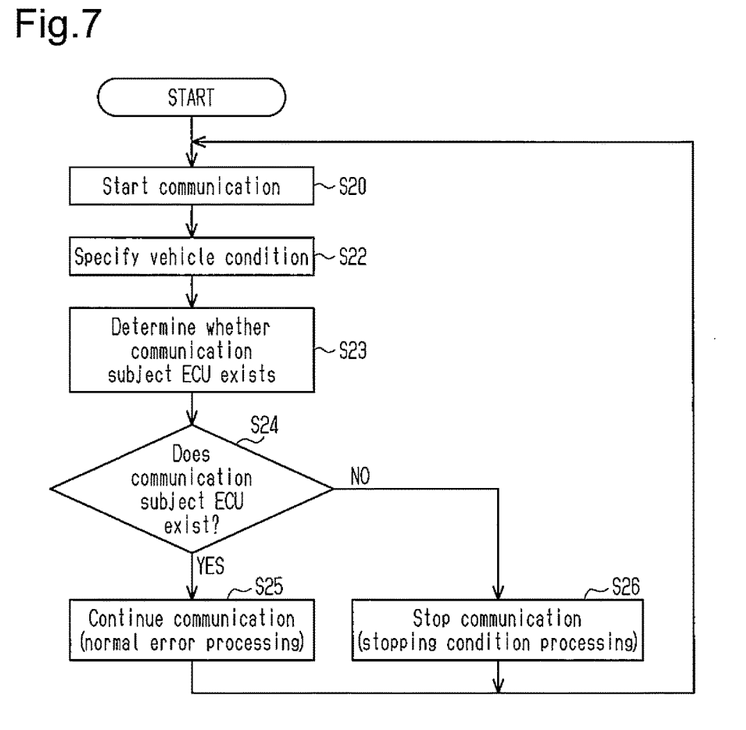
FIG. 7 is a flowchart illustrating the procedures of a process for stopping and restarting communication performed by a communication device of the communication system.

With reference to FIG. 7, the procedures of the communication processing performed on the ECUs 21 to 42 and the GW will now be described.

First, the procedures of the communication processing performed on the audio ECU 22 will now be described. The procedures of the communication processing performed on the other ECUs will not be described.

When the power goes on or when activated from a sleep state, the audio ECU 22 starts to function and perform normal CAN communication (step S20). When normal CAN communication starts, the audio ECU 22 determines whether or not there is a response to the transmitted communication message and specifies the vehicle condition from the external information or the like (step S22). Here, a case in which there is no response to the communication message and a communication error is detected will be described. Then, based on the specified vehicle condition, the audio ECU 22 determines whether or not a communication subject ECU exists (step S23). The determination of whether or not a communication subject ECU exists is determined from the relationship of the present key position and the activated ECU (refer to list 80) and the ECU required for processing the "audio on/off" operation (refer to list 81). It is determined that a communication subject ECU exists when there is a response to the transmitted communication message. When determined that a communication subject ECU exists (YES in step S24), the audio ECU 22 continues normal error processing (step S25). More specifically, the audio ECU 22 returns to step S20 after a fixed interval and continues normal CAN communication.

When determined that there is no communication subject ECU (NO in step S24), the audio ECU 22 stops the transmission of communication messages and shifts to a reception wait state to continue waiting for the reception of a communication message (step S26). When determined that a communication message has been received, the audio ECU 22 returns to step S20 and starts normal CAN communication.

With reference to FIG. 7, the procedures of the communication processing performed on the GW 50 will now be described.

When the power goes on or when activated from a sleep state, the GW 50 starts to function and perform normal CAN communication that enables the transmission of communication messages (step S20). In the normal CAN communication, the GW 50 determines whether or not a responding ECU exists on the buses 20 to 40. That is, the GW 50 determines whether or not an ECU on the buses 20 to 40 is communicating with an ECU on another bus. When normal CAN communication starts, the GW 50 determines whether or not there is a communication error and specifies the vehicle condition from the external information or the like (step S22). Here, a case in which a communication error is detected will be described. Then, based on the specified vehicle condition, the GW 50 determines whether or not a communication subject ECU exists on a bus that differs from the communication origin bus (step S23). When determined that a communication subject ECU exists on the other bus (YES in step S24), the GW 50 continues communication between the buses based on the normal error processing (step S25). More specifically, the GW 50 returns to step S20 and continues normal CAN communication that allows for the transfer of communication messages between the buses.

When determined that there is no communication subject ECU on the other bus (NO in step S24), the GW 50 stops the transmission of communication messages from the communication origin bus to the communication destination bus and shifts to a reception wait state to continue waiting for the reception of a communication message (step S26). When determined that a communication message has been received, the GW 50 returns to step S20 and starts normal CAN communication that enables the transmission of communication messages.

This provides a communication device, a communication method used for the communication device, and a communication system including the communication system that reduce power consumed for communication that is based on the CAN protocol.

The communication system in the second embodiment has the advantages described below in addition to advantages (1) to (5) of the first embodiment.

(6) When the device operated by the user does not require information communication, information communication is restricted. This reduces power consumption.

(7) A door open/close operation or a seat position operation may be performed when the vehicle 2 is parked. However, when the vehicle 2 is parked, only the communication devices required for such operations need to be activated. Information communication through the communication line may be unnecessary for such operations. Thus, by restricting information communication when only a door open/close operation of a seat position operation is performed, power consumption of the communication device can be reduced.

Third Embodiment

Figure 8:
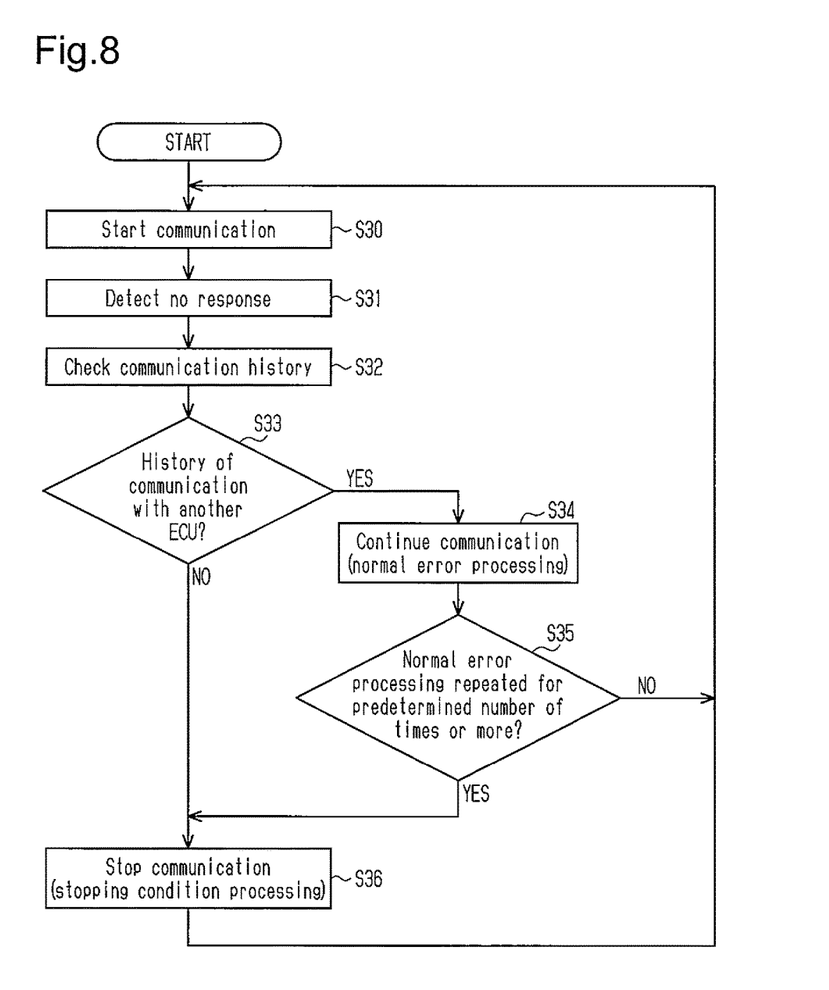
FIG. 8 is a flowchart for a third embodiment of a communication system including a communication device and illustrating the procedures of a process for stopping and restarting communication performed by the communication device.

A third embodiment of a communication system will now be described with reference to FIG. 8. The third embodiment differs from the first embodiment in that a communication history is used to determine whether or not a communication subject ECU exists. Otherwise, the configuration is the same as the first embodiment. The description hereafter will focus on the differences from the first embodiment and parts that are similar to the first embodiment will not be described in detail.

In the third embodiment, for example, the first ECU 11 holds vehicle conditions and the history of the ECUs that performed communication under such vehicle conditions. Such a history holds the latest information for each vehicle condition. Two or more latest information may be held as the history. Contents of the history may be deleted when updating is not performed for a predetermined period or longer or when a certain number of activations or more are performed.

The communication error processing illustrated in FIG. 8 will now be described using the first ECU 11 as an example in the third embodiment.

When the power goes on or when activated from a sleep state, the first ECU 11 starts to function and perform normal CAN communication (step S30). When normal CAN communication starts, the first ECU 11 detects that there is no response to the transmitted communication message (step S31). When there is a response to the transmitted communication message, normal CAN communication is performed (not illustrated). When a response is not detected, the first ECU 11 checks the communication history (step S32). When checking the communication history, the vehicle condition is specified from the external information, and the ECUs that have communicated in the past in the same vehicle condition are obtained. Then, the first ECU 11 determines whether or not there is an ECU that performed communication in the past under the same vehicle condition (step S33).

When determining that there is an ECU that performed communication in the past under the same vehicle condition (YES in step S33), the first ECU 11 continues communication that is in accordance with the normal communication error processing (step S34) and determines whether or not such normal communication error processing has been repeated for a predetermined number of times or more (step S35). When determining that the communication error processing has not been repeated for a predetermined number of times or more (NO in step S35), the first ECU 11 returns to step S30 and continues normal CAN communication while performing normal error processing. Thus, the first ECU 11 consumes power whenever transmitting a communication message during normal error processing.

When determining that there is no ECU that performed communication in the past under the same vehicle condition (NO in step S33) or when determining that the communication error processing has been repeated for a predetermined number of times or more (YES in step S35), the first ECU 11 stops the transmission of communication messages (step S36). When the transmission of the communication message is stopped, the first ECU 11 shifts to a reception wait state to continue waiting for the reception of a communication message. This reduces power consumption. Although not illustrated in the drawings, in the reception wait state, when a communication message is received, the first ECU 11 returns to step S30 and starts normal CAN communication with the next message.

The operations in the communication error processing are performed when the first ECU 11 is activated and ended when the first ECU 11 is deactivated or reset.

The communication system in the third embodiment has the advantage described below in addition to advantages (1) to (5) of the first embodiment.

(8) Information communication and external information are associated and stored as history. The obtained external information is used to determine the ECU that is a communication peer by referring to the stored history. For example, after the vehicle is shipped from the manufacturing plant, when there is a change in the type or number of ECUs or the like connected to the communication bus or when the functions are changed and the communication peer ECU is changed, the use of the history allows such changes to be coped with. This enables the existence of a communication peer corresponding to the obtained external information to be determined in a suitable manner.

Other Embodiments

The above embodiments may be modified as described below.

In each of the above embodiments, the data frame is in the standard format. Instead, the data frame may be in the extended format. This improves the freedom of design for the communication system.

In each of the above embodiments, the number of buses is one or three. Instead, the number of buses may be two or four or greater. This allows for expansion in the applicability of such a communication system.

In each of the above embodiments, the number of ECUs connected to the communication bus 10 or the first to third buses 20, 30, and 40 is two or three. Instead, the number of ECUs or the like connected to the bus may be four or greater as long as the number is in compliance with the CAN protocol standard. This improves the freedom in the configuration of the communication system.

In each of the above embodiments, the ECUs 11, 12, and 21 to 42 are each configured to include the communication necessity determination unit 113 and the communication control unit 114 but may be configured in any manner as long as the functions of the communication necessity determination unit and the communication control unit are provided.

In the same manner, in the second embodiment, the GW 50 includes the message reception unit 51, the communication necessity determination unit 52, the communication control unit 53, the memory unit 54, and the message transmission unit 55. Instead, the GW may be configured in any manner as long as the function of the message reception unit, the communication necessity determination unit, the communication control unit, the memory unit, and the message transmission unit are provided.

This improves the freedom of design of the communication system.

In each of the above embodiments, the condition for restarting communication is the reception of a communication message. Instead, subsequent to an information communication necessity determination by the communication necessity determination unit that is "negative," the communication restarting condition may be the determination that information communication is needed because of a change in the condition of the vehicle. The transmission restarting condition may be satisfied based on such a determination. That is, even when reducing the power required for communication when determined that information communication is unnecessary, communication may be recovered in a suitable manner when necessary.

In each of the above embodiments, the ACK error is used to determine whether or not information communication is necessary. Instead, as long as it can be specified that there is no communication peer, it can be determined that there is no communication peer from a signal indicating "transmission incomplete" and generated when an ACK error occurs or a signal indicating that there is no response and generated when another error occurs. This improves the freedom of design of the communication device.

In each of the above embodiments, each ECU includes a communication necessity determination unit. Instead, just some of the ECUs may be provided with the communication necessity determination unit. This also reduces the power consumption amount of the ECU that includes the communication determination unit.

In the second embodiment, the vehicle condition and the ECU activated in association with the vehicle condition are set in each of the ECUs 21 to 42 and the memory 54 of the GW 50. Instead, such settings may be stored in only the necessary ECUs or in only the GW. In this case, the determination of the necessity of communication information may be determined by only the necessary ECU or GW that refers to such setting. This improves the freedom of design of the communication system.

At least some of the information similar to the list 81 in the second embodiment may be held as the information used to determine the necessity of the information communication held in each of the ECUs 11 and 12 of the first and third embodiments.

In the first and second embodiments, the vehicle condition is determined after the determination of whether or not an ACK error exists. Instead, as long as the necessity of information communication and, when necessary, the determination of whether or not an ACK error exists are performed, the determination of whether or not an ACK error exists may be performed after the determination of the vehicle condition. Alternatively, these determinations may be performed in parallel. This improves the freedom of design of the communication device.

In the third embodiment, the communication history is checked after determining whether or not an ACK exists. Instead, as long as the necessity of information communication and, when necessary, the determination of whether or not an ACK error exists are performed, the determination of whether or not an ACK exists may be performed after checking the communication history or in parallel to the checking of the communication history. This improves the freedom of design of the communication device.

In each of the above embodiments, the communication bus is a bus that is based on the CAN protocol. Instead, the communication protocol may be a protocol other than the CAN protocol as long as the bus is used for communication and connected to a plurality of communication devices and the communication device can determine whether or not a reception side exists. This enlarges the applicability of the communication system.

In each of the above embodiments, the vehicles 1 and 2 are plugin hybrid vehicles or electric vehicles. However, the vehicle may be a hybrid vehicle or a vehicle that uses only an engine as a drive source. Further, the communication system may be arranged in a movable body other than a motor vehicle such as a vessel, a train, an industrial machine, or a robot.

The invention claimed is:

1. A communication device, wherein the communication device is connected to an external device to obtain external information from the external device and the communication device is connected to a communication line to perform information communication through the communication line based on communication data specified by a CAN protocol, the communication device comprising:
   a communication necessity determination unit that determines whether or not the information communication through the communication line is necessary based on the external information obtained from the external device; and
   a communication control unit that stops the information communication during a fixed period, under the condition that the determination by the communication necessity determination unit of whether or not the information communication is necessary is "affirmative" and that a communication error has been detected, and restarts the information communication after the fixed period elapses, wherein the communication control unit stops transmitting communication data, under the condition that the determination by the communication necessity determination unit of whether or not the information communication is necessary is negative and that a communication error has been detected, until a predetermined transmission restarting condition is satisfied.

2. The communication device according to claim 1, wherein the communication control unit continues to receive communication data when the determination by the communication necessity determination unit of whether or not the information communication is necessary is "negative", and the transmission restarting condition includes the communication control unit receiving the communication data through the communication line.

3. The communication device according to claim 1, wherein the transmission restarting condition includes the communication necessity determination unit determining that information communication through the communication line is necessary.

4. The communication device according to claim 1, wherein the communication device is installed in a vehicle that uses a battery as a power source.

5. The communication device according to claim 4, wherein the communication necessity determination unit determines that the information communication through the communication line is unnecessary when detecting from the external information that the battery of the vehicle is being charged.

6. The communication device according to claim 1, wherein the communication necessity determination unit determines that the information communication through the communication line is unnecessary when detecting from the external information that only a device that does not require the information communication through the communication line has been operated.

7. The communication device according to claim 6, the operation of only a device that does not require the information communication through the communication line includes at least one of a door open/close operation and a seat position operation.

8. The communication device according to claim 1, wherein the communication device has setting information associated with the external information and indicating whether or not a communication peer that performs the information communication through the communication line exists, and the communication necessity determination unit determines whether or not the information communication through the communication line is necessary based on the setting information and the external information.

9. The communication device according to claim 1, wherein the communication necessity determination unit stores a history of the information communication performed through the communication line in association with the external information obtained at that time and determines whether or not a communication peer associated with the external information exists by referring to the stored history.

10. A communication method for use with a communication device, wherein the communication device is connected to an external device to obtain external information from the external device and the communication device is connected to a communication line to perform information communication through the communication line based on communication data specified by a CAN protocol, the communication method comprising:

determining whether or not the information communication through the communication line is necessary based on the external information obtained from the external device;

stopping the information communication during a fixed period, under the condition that the determination of whether or not the information communication is necessary is "affirmative" and that a communication error has been detected, and restarting the information communication after the fixed period elapses; and stopping transmission of communication data, under the condition that the determination of whether or not the information communication is necessary is negative and that a communication error has been detected, until a predetermined transmission restarting condition is satisfied.

11. A communication system comprising:

a plurality of communication devices, each of the communication devices being connected to an external device to obtain external information from the external device and being connected to a communication line to perform information communication through the communication line based on communication data specified by a CAN protocol, wherein each of the communication devices includes:

a communication necessity determination unit that determines whether or not the information communication through the communication line is necessary based on the external information obtained from the external device; and a communication control unit that stops the information communication during a fixed period, under the condition that the determination by the communication necessity determination unit of whether or not the information communication is necessary is "affirmative" and that a communication error has been detected, and restarts the information communication after the fixed period elapses, wherein the communication control unit stops transmitting communication data, under the condition that the determination by the communication necessity determination unit of whether or not the information communication is necessary is negative and that a communication error has been detected, until a predetermined transmission restarting condition is satisfied.

* * * * *